US009418281B2

(12) United States Patent
Rowley et al.

(10) Patent No.: US 9,418,281 B2
(45) Date of Patent: Aug. 16, 2016

(54) SEGMENTATION OF OVERWRITTEN ONLINE HANDWRITING INPUT (71) Applicant: Google Inc., Mountain View, CA (US)

(72) Inventors: Henry Allan Rowley, Sunnyvale, CA (US); Thomas Deselaers, Zurich (CH); Li-Lun Wang, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 67 days.

(21) Appl. No.: 14/142,964

(22) Filed: Dec. 30, 2013

(65) Prior Publication Data

US 2015/0186718 A1 Jul. 2, 2015

(51) Int. Cl.
G06K 9/34 (2006.01)
G06K 9/00 (2006.01)

(52) U.S. Cl.
CPC .................. G06K 9/00402 (2013.01)

(58) Field of Classification Search
None
See application file for complete search history.

(56) References Cited

U.S. PATENT DOCUMENTS

| | | | | |
|---|---|---|---|---|
| 4,680,804 A * | 7/1987 | Kuzunuki et al. | | 382/185 |
| 5,517,578 A | 5/1996 | Altman et al. | | |
| 5,687,254 A * | 11/1997 | Poon et al. | | 382/229 |
| 5,751,850 A | 5/1998 | Rindtorff | | |
| 5,832,474 A * | 11/1998 | Lopresti et al. | | |
| 5,991,441 A * | 11/1999 | Jourjine | | 382/187 |
| 6,201,553 B1 * | 3/2001 | Morooka | | G06T 11/001 345/468 |
| 6,275,611 B1 * | 8/2001 | Parthasarathy | | 382/187 |
| 6,393,395 B1 | 5/2002 | Guha et al. | | |
| 6,891,971 B2 * | 5/2005 | Loudon et al. | | 382/186 |
| 7,424,156 B2 * | 9/2008 | Huang | | 382/187 |
| 7,778,464 B2 * | 8/2010 | Lee et al. | | 382/185 |
| 7,821,503 B2 * | 10/2010 | Stephanick et al. | | 345/173 |
| 8,560,974 B1 * | 10/2013 | Yonge-Mallo | | 715/863 |
| 2003/0086611 A1 * | 5/2003 | Loudon et al. | | 382/186 |
| 2003/0185444 A1 * | 10/2003 | Honda | | 382/186 |
| 2005/0220344 A1 * | 10/2005 | Akiyama | | G06K 9/222 382/187 |
| 2014/0160032 A1 * | 6/2014 | Che | | G06F 3/018 345/173 |

FOREIGN PATENT DOCUMENTS

| | | |
|---|---|---|
| EP | 0077414 | 1/1987 |
| WO | 9534047 | 12/1995 |
| WO | 9641300 | 12/1996 |

OTHER PUBLICATIONS

Overlapped handwriting input—phones, Zou et al., IEEE, 1520-5363, 2011, pp. 369-373.*
Graves et al.,"Unconstrained Online Handwriting Recognition with Recurrent Neural Networks", Advances in Neural Information Processing Systems 21, NIPS'21, p. 577-584, 2008, MIT Press, Cambridge, MA, 2008.
Wan, Xiang et al.,"On-line Chinese Recognition System for Overlapping Samples", 2011 International Conference on Document Analysis and Recognition, pp. 167-182, 2011.
Yaeger et al.,"Combining Neural Networks and Context-Driven Search for Online, Printed Handwriting Recognition in the Newton", AAAI's AI Magazine, Spring 1998.
Zou, Yanming et al.,"Overlapped handwriting input on mobile phones", 2011 International Conference on Document Analysis and Recognition, pp. 369-373, 2011.

* cited by examiner

Primary Examiner — Jayesh A Patel
(74) Attorney, Agent, or Firm — Fish & Richardson P.C.

(57) ABSTRACT

Implementations of the disclosed subject matter provide methods and systems for identifying a candidate character cut for an overwritten character. A method may include providing a handwriting input area. The handwriting input area may be divided into multiple sections and a first portion of the multiple sections may be located in an end point region. A first handwritten input comprising a first stroke that ends in a section located in the end point region may be received. A second handwritten input comprising a second stroke that begins in a section that is not located in the end point region may be received. As a result, a first candidate character cut may be identified between the first stroke and the second stroke.

44 Claims, 5 Drawing Sheets

SEGMENTATION OF OVERWRITTEN ONLINE HANDWRITING INPUT

BACKGROUND

In general, handwriting recognition is the ability of a computer to receive and interpret intelligible handwritten input from sources such as paper documents, photographs, touchscreens and other devices. Among various recognition techniques, a complete handwriting recognition system also handles formatting, performs correct segmentation into characters and finds the most plausible words. For handwriting recognition providers that hypothesize cut points between characters and recognize the segments between these cuts, higher accuracy in identifying correct cuts between characters leads to higher text recognition accuracy. Reducing the number of incorrect cuts, such as in the middle of a character, may improve recognition speed and accuracy. One technique may be to track the overall horizontal overlap of characters in handwritten input and use the distance between characters to determine whether to make a cut in the handwritten input for recognition of individual characters. However, in the case of overwriting of a character in handwritten input, it can be difficult to determine where to make a candidate character cut in the handwritten input corresponding to a previous character or a new character that is written over the previous character.

BRIEF SUMMARY

According to an implementation, a method may include providing a handwriting input area. The handwriting input area may be divided into a plurality of sections and a first portion of the plurality of sections may be located in an end point region. A first handwritten input comprising a first stroke that ends in a section located in the end point region may be received. A second handwritten input comprising a second stroke that begins in a section that is not located in the end point region may be received. As a result, a first candidate character cut may be identified between the first stroke and the second stroke.

An implementation of the disclosed subject matter provides a system including a processor configured to provide a handwriting input area. The handwriting input area may be divided into a plurality of sections and a first portion of the plurality of sections may be located in an end point region. A first handwritten input comprising a first stroke that ends in a section located in the end point region may be received. A second handwritten input comprising a second stroke that begins in a section that is not located in the end point region may be received. As a result, a first candidate character cut may be identified between the first stroke and the second stroke.

Implementations of the disclosed subject matter provide methods and systems for detecting overwriting of a character in online handwritten input. Techniques disclosed herein allow for more accurate segmentation of online handwritten input by determining whether a handwritten input is associated with a previous character or a new character. Detecting overwriting of a character and accordingly segmenting an online handwritten input may result in more accurate online handwriting recognition. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Typical online handwriting recognition systems that implement a segment and decode technique for recognizing characters in online handwritten input may lead to problems when attempting to recognize a new character that has been written over a previously written character. Here, "online" refers to receiving input from a recorded sequence of positions of pen or finger (in contrast to offline recognition, where the input is a photograph or scanned image, such as in optical character recognition (OCR)). In particular, online handwriting recognition involves the automatic conversion of text as it is written in a handwritten input area on a device, where a sensor picks up the pen-tip movements as well as pen-up/pen-down switching. This kind of data may be referred to as digital ink, and can be regarded as a digital representation of handwriting. The obtained signal is converted into letter codes which are usable within computer and text-processing applications. One difficulty in implementing the typical segment and decode technique in online handwriting recognition results from overwriting on a previously written character with a new character. In particular, it can be difficult to determine whether and where a handwritten input including multiple strokes should be segmented for recognition of characters. For handwriting recognition providers that hypothesize candidate character cut points between strokes and recognize the segments between these cuts, a high accuracy in identifying correct candidate character cuts between strokes in a handwritten input provides a relatively high accuracy in character recognition. A candidate character cut may be a point between strokes in a handwritten input that distinguishes between one or more strokes associated with one character from one or more strokes associated with another character. As a result, a first segment including one or more strokes prior to a candidate character cut may be associated with one character and a second segment including one or more strokes after a candidate character cut may be associated with another character. In general, a candidate character cut may segment one character from another character for recognition of the characters in a handwritten input. Reducing the number of incorrect candidate character cuts, such as in the middle of a character, may improve recognition speed and accuracy.

Segmentation of a handwritten input may be performed according to any standard segmenting approach used in handwriting recognition systems. In general, a segment may include one or more strokes that may correspond to a portion of a character, an entire character, multiple characters, or any combination thereof. In some cases, one or more segments may overlap with one another. As an example, a handwritten input may consist of two strokes that look like "cl". This handwritten input may be segmented into the segments "c", "l", and "cl". One or more subsets of each of these segments may be classified providing candidate characters "c", "l", and "cl". In general, recognition of a segment or group of segments may be performed according to any standard classification approach used in handwriting recognition. For example, a segment may be classified and/or a label associated with the segment may be predicted. Techniques for classifying and/or labeling a segment may be used to identify a recognized character based on the received handwritten input and may be performed by any suitable system such as a machine learning system. In some cases, the handwritten input may be segmented into multiple segments. In general, each segment, and in some cases, groups of segments may be recognized as one or more characters in one classification. Each segment and/or group of segments may be classified according to a set of known characters. As a result, one or more recognized characters may be provided for each segment and/or group of segments. A handwriting recognition system may find the best explanation of the handwritten input as a text input, taking into account multiple possible segmentations.

A step of character matching and/or prediction may or may not be performed for each segment and/or character individually, and may be based on the context of the multiple segments in a handwritten input. Examples of techniques for recognizing a character may include feature extraction followed by classification with neural networks, nearest neighbor search, support vector machines, HMMs, and the like. A standard decoding technique may be used to search for the best explanation of the overall input taking into account multiple possible segmentations and also other knowledge sources such as a language model.

In some cases, it can be difficult to determine whether and where a handwritten input, that includes multiple strokes, should be segmented for recognition of characters. For example, a user may write a new character over a previously written character in a handwriting input area, such as on a mobile device. In this case, if a stroke associated with the new character is incorrectly associated with the previously written character, recognition of the new character and/or previously written character may not be accurate. As such, it is important to identify a candidate character cut between a stroke associated with the new character and one or more strokes associated with the previously written character. As a result of the techniques described herein, a handwriting recognition system may be able to more accurately classify the new character and the previously written character, while allowing a user to overwrite characters in the handwriting input area. As an example, in order to detect overwriting of a character, a handwriting input area may be divided into a grid, which may include multiple sections. A first stroke may end somewhere in the lower-right region of the handwriting input area. A second stroke may begin in a region other than the lower-right region of the handwriting input region, e.g., the upper left region. A candidate character cut may be identified between the first stroke and the second stroke. Accordingly, the first stroke may be associated with character A and the second stroke may be associated with a new character B that is being overwritten over character A. On the other hand, if the second stroke begins somewhere in the lower-right region of the handwriting input area, the second stroke may be combined with the first stroke as part of character A. Although the implementations described herein apply to languages that are written from left-to-right and top-to-bottom, the techniques described herein may be adapted for languages that are written from top-to-bottom (e.g., traditional Japanese or Chinese) or right-to-left (e.g., Hebrew).

Figure 1:
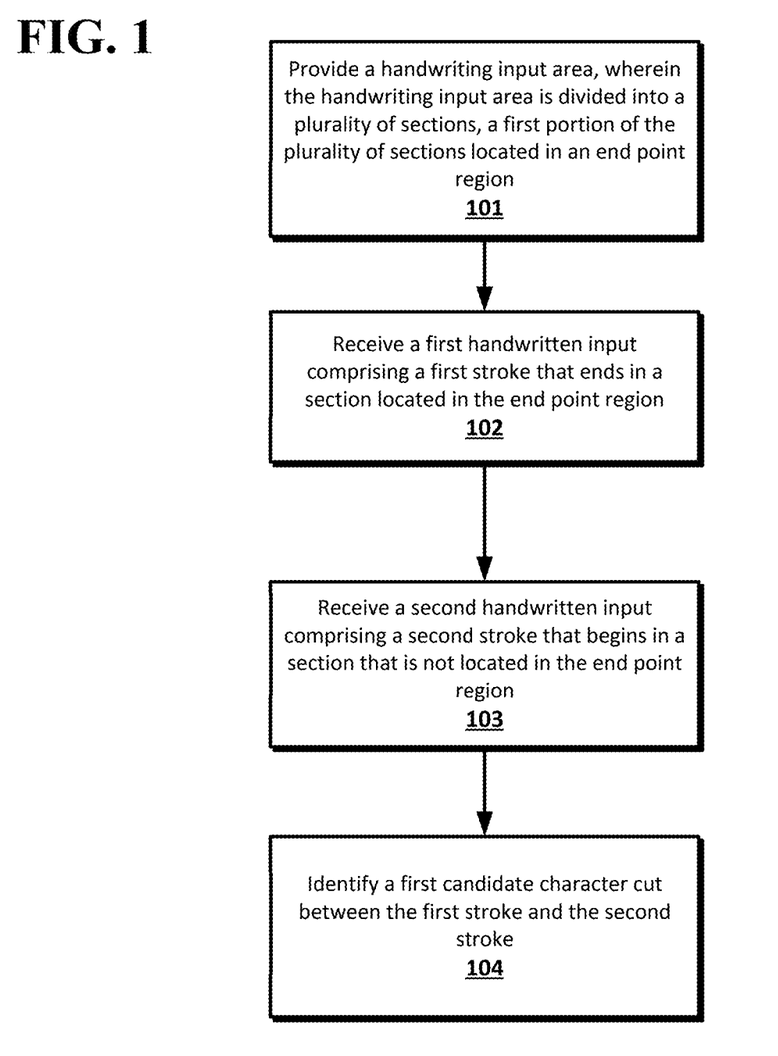
FIG. 1 shows an example process according to an implementation of the disclosed subject matter.

Implementations of the disclosed subject matter provide methods and systems for segmenting a handwritten input by identifying a candidate character cut for an overwritten character. FIG. 1 shows an example process according to an implementation of the disclosed subject matter. A method may include providing a handwriting input area. The handwriting input area may be divided into multiple sections and a first portion of the multiple sections may be located in an end point region, at 101. A first handwritten input comprising a first stroke that ends in a section located in the end point region may be received, at 102. A second handwritten input comprising a second stroke that begins in a section that is not located in the end point region may be received, at 103. As a result, a first candidate character cut may be identified between the first stroke and the second stroke, at 104.

Figure 2:
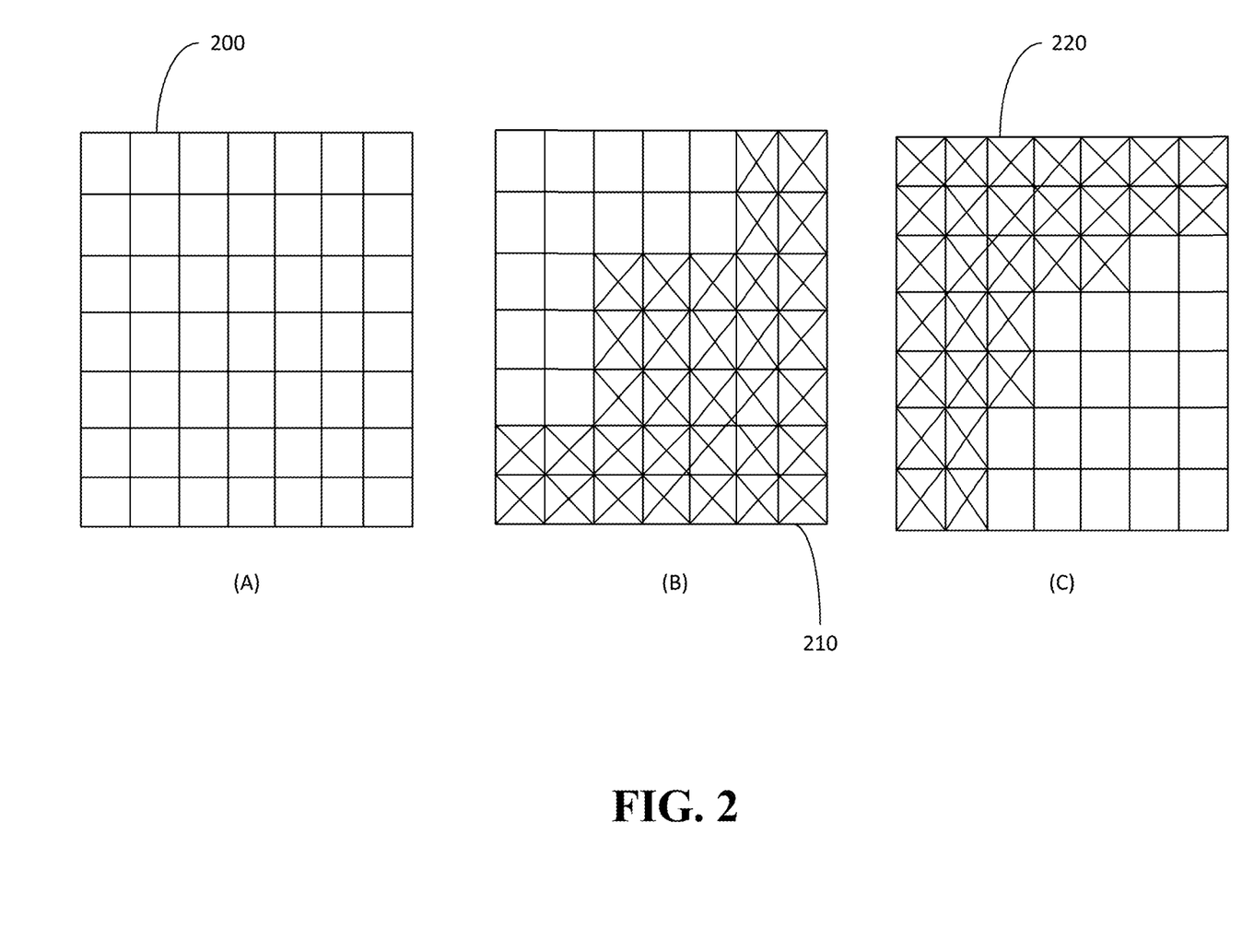
FIG. 2 shows an example handwriting input area according to an implementation of the disclosed subject matter.

A handwriting input area may be provided, for example displayed, on a variety of devices such as a PC, laptop, mobile device, tablet, and any other device that may receive handwritten input. In some cases, providing of a handwriting input may be dynamic (e.g., generated by a display device when in a handwriting input mode) or static (e.g., a dedicated, pre-bounded and/or pre-patterned region may form the handwriting input area). In some cases, a handwriting input area may be provided by indicating to a user where to provide a handwritten input. A handwriting input area may be divided into multiple sections. In some cases, the handwriting input area may be rectangular in shape and the handwriting input area may be divided into multiple sections in an A×B grid arrangement. As specific examples, the handwriting input area may be divided into a total of nine sections in a 3×3 grid, a total of forty-nine sections in a 7×7 grid, a total of forty-two sections in a 7×6 grid, and the like. Among the multiple sections, a portion of the multiple sections may be located in, or defined as, an end point region, and a portion of the sections may be located in a start point region. Typically the end point region is located in the bottom-right portion of the handwriting input area and the start point region is located in the top-left portion of the handwriting input area, though other specific arrangements may be used, such as where different regions are defined as the start- and end-point regions based upon a specific script in which user input is expected to be received. FIG. 2 shows an example handwriting input area according to an implementation of the disclosed subject matter. As shown in FIG. 2(A), a handwriting input area 200 may be divided into multiple sections. As a specific example, the handwriting input area 200 may be divided into 49 sections in a 7×7 grid arrangement. FIG. 2(B) shows an end point region 210 located in the bottom-right portion of the handwriting input area and FIG. 2(C) shown a start point region 220 located in the top-left portion of the handwriting input area. As shown in FIGS. 2(B) and (C), one or more sections may be located in both the start point region and the end point region, such as those sections located near the center of the handwriting input area. The location of the end point and/or start point regions in the handwriting input area may be based on a script associated with a handwritten input and a script may be associated with a language. For example, the number and location of sections that are located in an end point region associated with handwritten input in Latin script may be different from the number and location of sections located in the end point region associated with handwritten input in Devanagari script.

Figure 3:
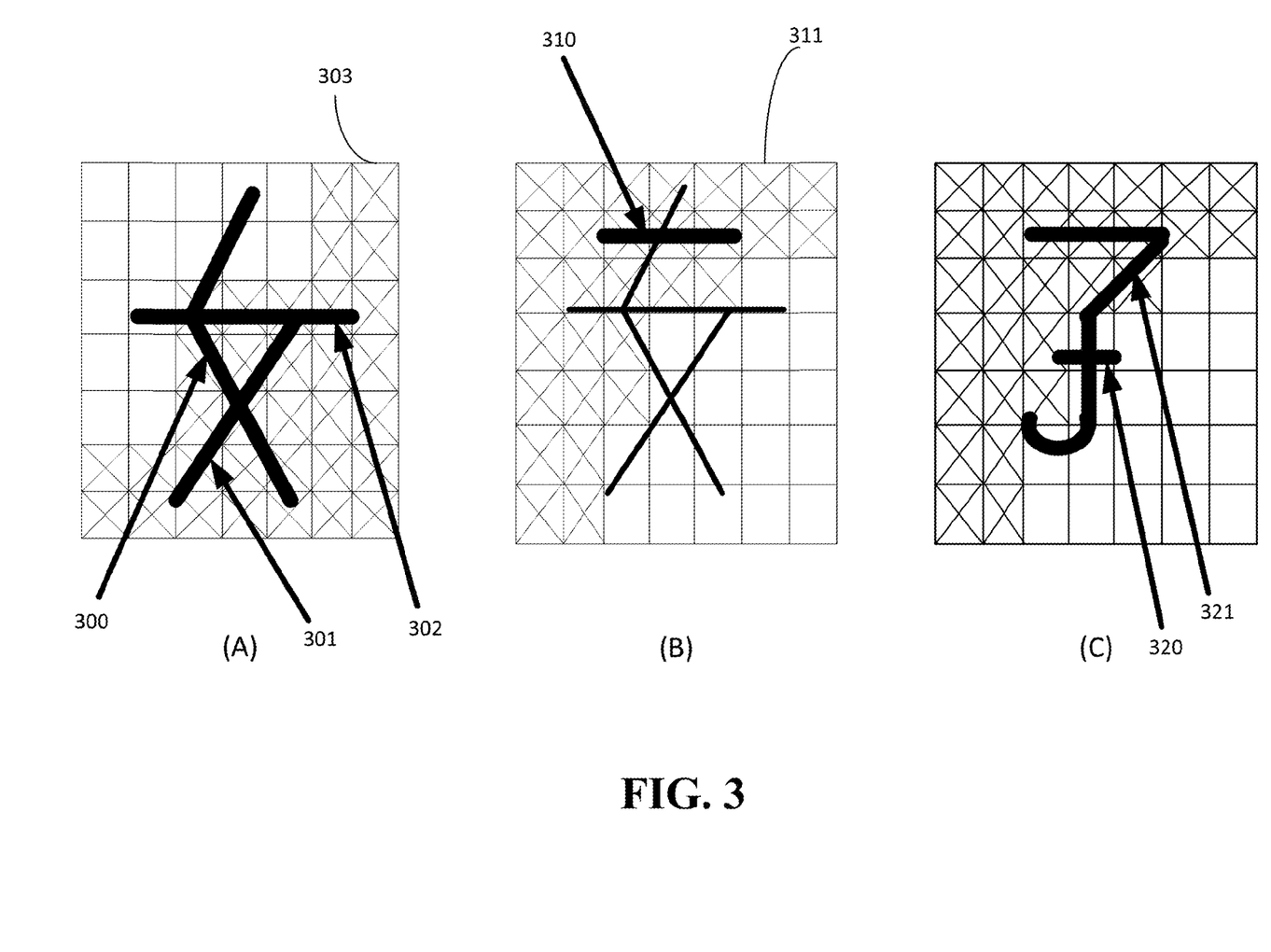
FIG. 3 shows an example handwriting input according to an implementation of the disclosed subject matter.

According to an implementation of the disclosed subject matter, a system may include a processor configured to provide a handwriting input area and the handwriting input area may be divided into multiple sections. FIG. 3 shows an example handwriting input according to an implementation of the disclosed subject matter. As shown in FIG. 3(A), a portion of the multiple sections may be located in an end point region 303. A handwritten input may include one or more strokes; for example, multiple strokes 300, 301, and 302 may be received in the handwriting input area. The strokes may be received in the order of first stroke 300, second stroke 301, and third stroke 302. As shown, stroke 302 may end in a section located in the end point region 303. Next, a handwritten input overwriting the previous strokes 300, 301, and 302 may be received. As shown in FIG. 3(B), stroke 310 may be received, and stroke 310 may begin in a section that is not located in the end point region 303. In particular, stroke 310 may begin in a section that is located in a start point region 311. As a result, a candidate character cut may be identified between stroke 302 and stroke 310. Following stroke 310, additional strokes 320 and 321 may be received as shown in FIG. 3(C). Based on the candidate character cut inserted between strokes 302 and 310, the strokes 300, 301, and 302 received prior to the candidate character cut may be ignored during recognition of a character associated with strokes after the candidate character cut. For example, it may be determined that strokes 300, 301, and 302 are associated with the character 女. Next, it may be determined that the strokes 310, 320, and 321 are associated with the character 子 which may have been written over the previously written character 女. The techniques described herein for identifying a candidate character cut between strokes in a handwritten input may be repeated for each stroke and/or each handwritten input received in a handwriting input area.

In some cases, a candidate character cut may not be identified and inserted. For example, a first stroke may end in a section located in the end point region and a second stroke may begin in a section located in the end point region. In this case, a candidate character cut may not be inserted between the first stroke and the second stroke. Accordingly, the first and second strokes may both be associated with the same character.

In addition to identifying an overwritten character and inserting a candidate character cut between strokes in a handwritten input, the present disclosure also provides techniques for segmenting a handwritten input between characters written from left to right. In general, characters are written from left to right in time. In this case, if a new stroke is written to the left of one or more previously written strokes, the new stroke should typically be part of the previous character that includes the one or more previously written stroke. Accordingly, a candidate character cut should not be inserted between the new stroke and the one or more previously written strokes. On the other hand, if a new stroke is written to the right of one or more previously written strokes, it may be more likely that the new stroke should be considered a part of a new character. Accordingly, a candidate character cut may be inserted between the new stroke and the one or more previously written strokes.

Determining whether a new stroke is to be combined with one or more previously written strokes or segmented from the one or more previously written strokes and associated with a new character may be performed according to various techniques. For example, determining whether a new stroke is to the left or to the right of a previously written stroke may be based on tracking the rightmost edge of the handwritten input ink as new strokes are received. If a new stroke is to the right of the rightmost edge of the previously received handwritten input ink, a candidate cut may be inserted. Accordingly, the rightmost edge of the handwritten input ink associated with the new stroke may be used for identifying the next candidate cut and the process may continue. Several variations are possible in the details and techniques of how the edge of a handwritten input ink is extended with each new stroke received.

According to an implementation, rather than using the rightmost edge of the last stroke, a point between the left and right edges of the last stroke (e.g., 75% of the distance to the right of the leftmost edge) may be used to determine whether a candidate character cut may be inserted between a new stroke and the last stroke. Similarly, the point in the new stroke that is compared to be to the right of the previously received handwritten input ink (e.g., 75% towards the left edge from the right edge) may vary. These variations may allow for small overlaps in the horizontal extents of the characters and may cause hypothesizing additional candidate character cuts; however, the accuracy and recognition of characters may improve as a result.

Figure 4:
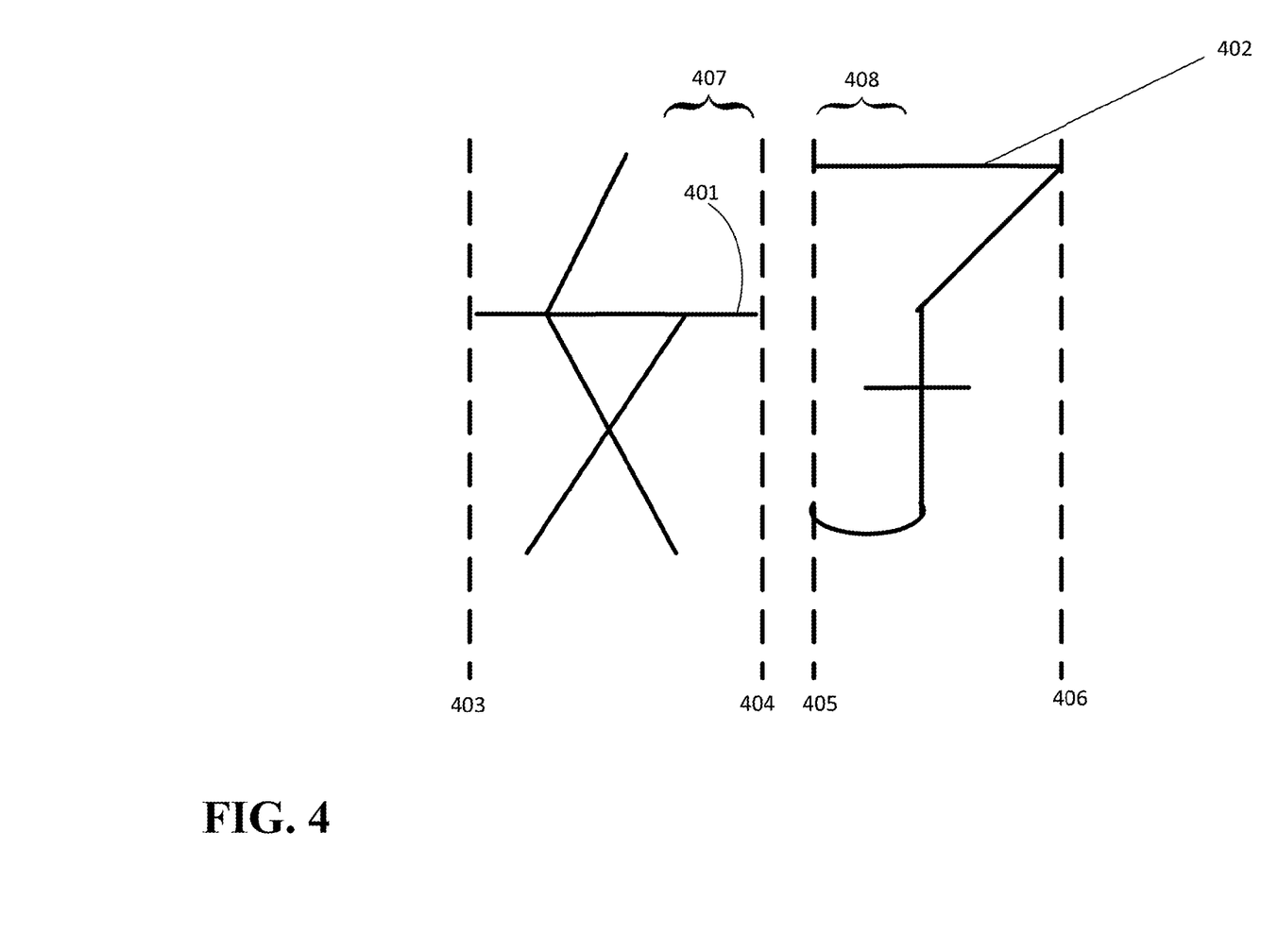
FIG. 4 shows an example segmentation according to an embodiment of the disclosed subject matter.

FIG. 4 shows an example segmentation according to an embodiment of the disclosed subject matter. As shown, stroke 401 may be received in a handwritten input and stroke 402 may be the next stroke received after stroke 401. Various techniques may be used to determine if stroke 402 was written sufficiently to the right of stroke 401 to indicate that a candidate character cut should be inserted between stroke 401 and 402. One technique may be to identify a distance between the leftmost edge 403 and the rightmost edge 404 of stroke 401. Although not shown in FIG. 4, stroke 402 may begin at a point between the leftmost edge 403 and the rightmost edge 404 of the stroke 401. In this case, it may be determined that stroke 402 begins at a threshold point to the right of the leftmost edge 403 of stroke 401 and a candidate character cut between stroke 401 and stroke 402 may be inserted. As a result, it may be determined that stroke 402 is associated with a character different from the character associated with stroke 401.

As a specific example, a threshold point between the leftmost edge 403 and the rightmost edge 404 may be at most 25% of the distance to the left of the rightmost edge 404, as shown at 407. Accordingly, if the start point of a new stroke 402 begins within 407 (e.g., 25% to the left of the rightmost edge 404) or to the right of the rightmost edge 404, a candidate character cut may be inserted between the new stroke and stroke 401. As a result, it may be determined that the new stroke 402 is associated with a character different from a character associated with stroke 401. Similarly, although not shown in FIG. 5, if a new stroke begins to the left of 407 (e.g., 75% to the right of the leftmost edge 403), a candidate character cut may not be inserted between the new stroke 402 and stroke 401. As a result, it may be determined that the new stroke 402 is associated with the same character as stroke 401.

A similar threshold point between the leftmost edge 405 and the rightmost edge 406 of stroke 402 may be used to determine if a candidate character cut should be inserted between stroke 401 and 402. As in the example described above, rather than using the start point of new stroke 402, a threshold point between the leftmost edge 405 and the rightmost edge 406 of stroke 402 may be used. For example, if a point within 408 (e.g., 25% to the right of the leftmost edge 405) of the new stroke 402 is written to the right of stroke 401 (e.g., within the threshold range 407 or to the right of rightmost edge 404), a candidate character cut may be inserted between stroke 402 and stroke 401. As a result, it may be determined that the new stroke 402 is associated with a character different from a character associated with stroke 401. The specific thresholds described with respect to FIG. 4 are provided for illustration purposes. More generally, thresholds used to determine whether a candidate character cut should be inserted may be set by a user or set automatically, and may be based upon the script and/or language in which handwriting input is received.

The horizontal segmentation technique described above and shown in FIG. 4 may also be implemented for multiple lines of handwritten input. For example, by tracking the vertical extent of previously received handwritten input ink, a stroke that is vertically below the previously received handwritten input ink may result in identification of a candidate character cut between a stroke in a first line above a new stroke in a second line vertically below the first line. As a specific example, the bottom most edge of a first stroke may be identified. A handwritten input comprising a second stroke may be received, and the second stroke may begin at a point below the bottom most edge of the first stroke. It may be determined that the second stroke begins at a threshold point below the bottom most edge of the first stroke. Based on this determination, a candidate character cut may be identified between the first stroke and the second stroke. It may also be determined that the second stroke is associated with a character that is different from a character associated with the first stroke. According to an implementation, once a candidate character cut has been identified between the first stroke and the second stroke based on a determination that the second stroke is below the first stroke, the horizontal extent of the handwritten input may be reset to include the second stroke. In general, a user may begin writing to the left (e.g., in a handwriting input area) when starting a new line of handwritten input.

Additionally, a bidirectional segmentation technique may be implemented based any of the segmentation techniques described herein wherein the segmentation techniques is performed based on the original time order of the handwritten input and the reverse time order of the handwritten input. For example, a bidirectional segmentation technique may be implemented by performing both left-to-right and right-to-left segmentation techniques, up-down and down-up segmentation techniques, as well as any other combination of directions in a segmentation technique. As described herein, a first stroke, a second stroke, a third stroke, and the like may be received in a handwriting input area in any order and are not limited to a particular sequential order in time relative to one another. Taking a bidirectional segmentation technique including both left-to-right and right-to-left segmentation techniques as an example, the horizontal segmentation technique may be performed twice; once with the handwritten ink in the original format as it was received, and a second time with the time order reversed, and x and y coordinates mirrored. Both the left-to-right and right-to-left horizontal segmentation techniques may produce candidate character cuts at correct points, but each may have different false cuts. Thus, by identifying a candidate character cut only when both the left-to-right and right-to-left segmentation techniques agree, the number of hypothesized candidate character cuts may be reduced. This may result in faster recognition by a handwriting recognition system.

As a specific example of a bidirectional segmentation technique that includes both left-to-right and right-to-left segmentation techniques, a distance between the left most edge and the right most edge of the second stroke may be identified. A third handwritten input including a third stroke may be received after the second stroke. According to a left-to-right segmentation technique, the time order of the second and third strokes may be evaluated in the original time order in which the second and third strokes were received. Based on a left-to-right segmentation technique, it may be determined that the third stroke begins at a threshold point to the right of the left most edge of the second stroke. According to a right-to-left segmentation technique, the time order of the second and third strokes may be evaluated in reverse time order such that the third stroke is evaluated first, relative to the second stroke. The left most edge of the third stroke may be identified. Based on a right-to-left segmentation technique, it may be determined that the second stroke ends at a threshold point to the left of the left most edge of the third stroke. By combining the determinations made by the left-to-right segmentation technique and the right-to-left segmentation technique, a candidate character cut between the second stroke and the third stroke may be identified. Based on the bidirectional segmentation technique, candidate character cuts are only made when both a first and second segmentation techniques agree. As a result, the number of candidate character cut hypothesis may be reduced, resulting in faster and more accurate recognition of characters. This technique may also reduce the occurrence of the problem of false positive candidate character cuts that may occur in the middle of a character.

Based on the segmentation techniques described herein, the horizontal and/or vertical segmentation techniques may be incrementally computed, which may be useful in an implementation with limited computational resources, such as on a mobile device. Each segmentation technique may result in correct candidate character cuts, but a first segmentation technique may result in different false candidate character cuts than a second segmentation technique.

Following identification and insertion of candidate character cuts in a handwritten ink input, the resulting segments of handwritten input may be recognized. For example, according to an implementation, one or more recognized characters corresponding to the received handwritten input may be provided. Recognition of a segment or group of segments may be performed according to any standard classification approach used in handwriting recognition. For example, a segment may be classified and/or a label associated with the segment may be predicted. Techniques for classifying and/or labeling a segment may be used to identify a recognized character based on the received handwritten input and may be performed by any suitable system such as a machine learning system. In general, each segment, and in some cases, groups of segments, may be recognized as one or more characters in one classification. In some cases, the handwritten input may be segmented into multiple segments. Each segment and/or group of segments may be classified according to a set of known characters in a script. As a result, one or more recognized characters may be provided for each segment and/or group of segments. A handwriting recognition system may find the best explanation of the handwritten input as a text input, taking into account multiple possible segmentations. Examples of techniques for recognizing a character may include feature extraction followed by classification with neural networks, nearest neighbor search, support vector machines, Hidden Markov Models (HMMs), and the like. A standard decoding technique may be used to search for the best explanation of the overall input taking into account multiple possible segmentations and also other knowledge sources such as a language model.

In an implementation, the communication between a device that can receive a handwritten input and a handwriting recognition provider may be across one or more bridges between the interfaces. For example, the communications between the device and the handwriting recognition provider may be managed or assisted by a third device, such as, a coordinating device, a local coordinator, a remote server, etc. In such cases, the third device may, for example, receive a first handwritten input comprising a first stroke that ends in a section located in the end point region and a second handwritten input comprising a second stroke that begins in a section that is not located in the end point region. The third device may provide the first and second handwritten inputs to the handwriting recognition provider, in which case, the handwriting recognition provider may identify a first candidate character overwriting cut between the first stroke and the second stroke and provide recognized characters corresponding to each segment prior to and after the first candidate character cut to, either, the third device or directly to the device that received the handwriting input. Alternatively, the third device may identify a first candidate character cut between the first stroke and the second stroke, and provide the resulting segments to the handwriting recognition provider for classifying. Accordingly, the handwriting recognition provider may provide recognized characters for each segment to, either, the third device or directly to the device that received the handwritten input. Furthermore, more than one intermediate device may be implemented to facilitate communication between devices and a handwriting recognition provider.

Figure 5:
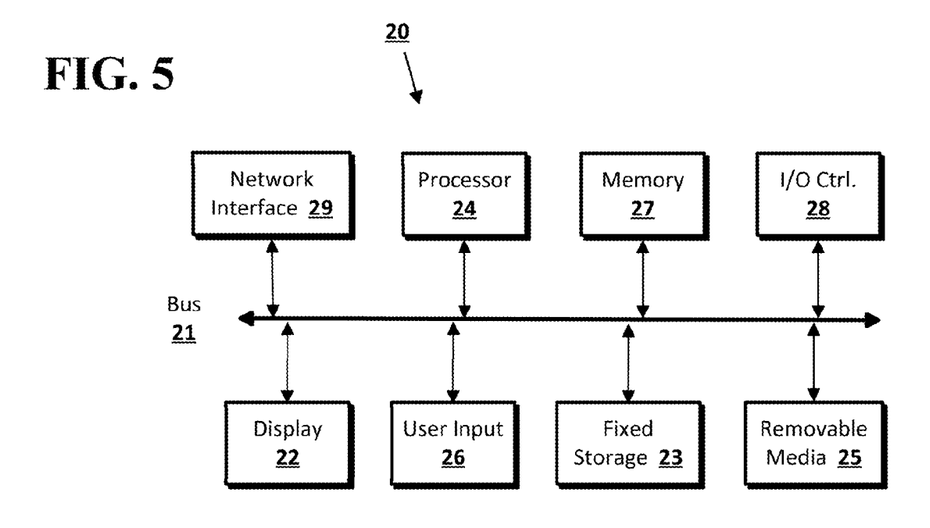
FIG. 5 shows a computer according to an embodiment of the disclosed subject matter.

Embodiments of the presently disclosed subject matter may be implemented in and used with a variety of component and network architectures. FIG. 5 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
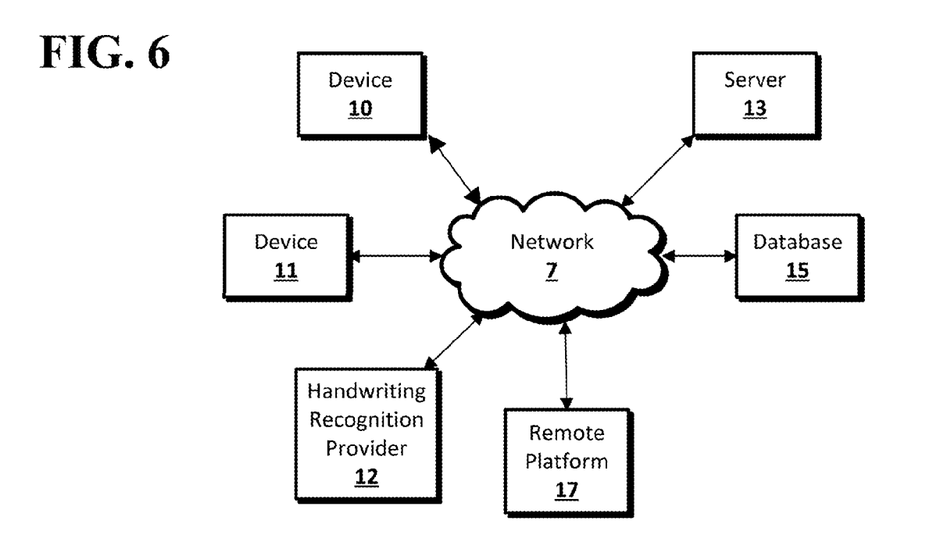
FIG. 6 shows a network configuration according to an embodiment of the disclosed subject matter.

FIG. 6 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more handwriting recognition providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more handwriting recognition providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. For example, while certain languages, scripts, phrases, words, and characters were chosen to illustrate the workings of the present disclosure, the teachings of the present disclosure are not so limited, and may apply to any appropriate language, script, and so on. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
  receiving, by a computing device, a sequence of strokes that represent a handwritten input that trace shapes of one or more handwritten characters along a handwriting input area of the computing device;
  determining, by the computing device, a predetermined sub-area of the handwriting input area that is characterized as a character end point sub-area;
  determining, by the computing device, that (i) an end point of a first stroke of the sequence of strokes occurs in the predetermined sub-area of the handwriting input area that is characterized as a character end point sub-area, and (ii) a beginning point of a second stroke of the sequence of strokes that immediately follows the first stroke occurs in a second sub-area of the handwriting input area that is not characterized as a character end point sub-area;
  based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the end point of the first stroke as a candidate end point of a first handwritten character traced by the sequence of strokes; and
  obtaining, by the computing device, a recognized character corresponding to the first handwritten character based at least in part on the designated candidate end point of the first handwritten character.

2. The method of claim 1, comprising:
  based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the second stroke as being associated with a second handwritten character.

3. The method of claim 1, wherein a location of the predetermined sub-area of the handwriting input area that is characterized as a character end point sub-area is based on a script associated with the handwritten input.

4. The method of claim 3, wherein the script is associated with a language.

5. The method of claim 1, wherein the predetermined sub-area of the handwriting input area that is characterized as a character end point sub-area is located in a bottom right portion of the handwriting input area.

6. The method of claim 1, comprising:
  determining, by the computing device, that a beginning point of a third stroke of the sequence of strokes that immediately follows the second stroke occurs in the predetermined sub-area of the handwriting input area that is characterized as a character end point sub-area.

7. The method of claim 1, comprising:
  determining, by the computing device, a distance between a left edge of the second stroke and a right edge of the second stroke.

8. The method of claim 7, comprising:
  determining, by the computing device, that a beginning point of a third stroke of the sequence of strokes that immediately follows the second stroke occurs between the left edge of the second stroke and the right edge of the second stroke.

9. The method of claim 8, comprising:
  determining, by the computing device, that a distance between the beginning point of the third stroke and the left edge of the second stroke satisfies a threshold distance.

10. The method of claim 9, wherein determining, by the computing device, that the distance between the beginning point of the third stroke and the left edge of the second stroke satisfies the threshold distance comprises:
  determining, by the computing device, that the distance between the beginning point of the third stroke and the left edge of the second stroke is less than 25% of the distance between the left edge of the second stroke and the right edge of the second stroke.

11. The method of claim 10, comprising:
  designating, by the computing device, the third stroke as being associated with a third handwritten character that is not associated with the first stroke or the second stroke.

12. The method of claim 9, wherein determining, by the computing device, that the distance between the beginning point of the third stroke and the left edge of the second stroke satisfies the threshold distance comprises:
  determining, by the computing device, that the distance between the beginning point of the third stroke and the left edge of the second stroke is greater than 75% of the distance between the left edge of the second stroke and the right edge of the second stroke.

13. The method of claim 12, comprising:
  designating, by the computing device, the third stroke as being associated with a same handwritten character as the second stroke.

14. The method of claim 7, comprising:
  determining, by the computing device, that a first distance between (i) a beginning point of a third stroke of the sequence of strokes and (ii) the left edge of the second stroke satisfies a first threshold;

determining, by the computing device, that a second distance between (i) an end point of the third stroke and (ii) the right edge of the second stroke satisfies a second threshold; and designating, by the computing device, the third stroke as being associated with a same handwritten character as the second stroke.

15. A system comprising:

one or more computers and one or more storage devices storing instructions that, when executed by the one or more computers, to cause the one or more computers to perform operations comprising:

receiving, by a computing device, a sequence of strokes that represent a handwritten input that trace shapes of one or more handwritten characters along a handwriting input area of the computing device;

determining, by the computing device, a predetermined sub-area of the handwriting input area that is characterized as a character end point sub-area;

determining, by the computing device, that (i) an end point of a first stroke of the sequence of strokes occurs in the predetermined sub-area of the handwriting input area that is characterized as a character end point sub-area, and (ii) a beginning point of a second stroke of the sequence of strokes that immediately follows the first stroke occurs in a second sub-area of the handwriting input area that is not characterized as a character end point sub-area;

based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the end point of the first stroke as a candidate end point of a first handwritten character traced by the sequence of strokes; and obtaining, by the computing device, a recognized character corresponding to the first handwritten character based at least in part on the designated candidate end point of the first handwritten character.

16. The system of claim 15, wherein the operations further comprise:

based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the second stroke as being associated with a second handwritten character.

17. The system of claim 15, wherein a location of the predetermined sub-area of the handwriting input area that is characterized as a character end point sub-area is based on a script associated with the handwritten input.

18. The system of claim 15, wherein the operations further comprise:

determining, by the computing device, a distance between a left edge of the second stroke and a right edge of the second stroke.

19. The system of claim 18, wherein the operations further comprise:

determining, by the computing device, that a beginning point of a third stroke of the sequence of strokes that immediately follows the second stroke occurs between the left edge of the second stroke and the right edge of the second stroke.

20. The system of claim 19, wherein the operations further comprise:

determining, by the computing device, that a distance between the beginning point of the third stroke and the left edge of the second stroke satisfies a threshold distance.

21. The system of claim 20, wherein determining, by the computing device, that the distance between the beginning point of the third stroke and the left edge of the second stroke satisfies the threshold distance comprises:

determining, by the computing device, that the distance between the beginning point of the third stroke and the left edge of the second stroke is less than 25% of the distance between the left edge of the second stroke and the right edge of the second stroke.

22. The system of claim 21, wherein the operations further comprise:

designating, by computing device, the third stroke as being associated with a third handwritten character that is not associated with the first stroke or the second stroke.

23. The system of claim 20, wherein determining, by the computing device, that the distance between the beginning point of the third stroke and the left edge of the second stroke satisfies the threshold distance comprises:

determining, by the computing device, that the distance between the beginning point of the third stroke and the left edge of the second stroke is greater than 75% of the distance between the left edge of the second stroke and the right edge of the second stroke.

24. The system of claim 23, wherein the operations further comprise:

designating, by the computing device, the third stroke as being associated with a same handwritten character as the second stroke.

25. The system of claim 18, wherein the operations further comprise:

determining, by the computing device, that a first distance between (i) a beginning point of a third stroke of the sequence of strokes and (ii) the left edge of the second stroke satisfies a first threshold;

determining, by the computing device, that a second distance between (i) an end point of the third stroke and (ii) the right edge of the second stroke satisfies a second threshold; and designating, by the computing device, the third stroke as being associated with a same handwritten character as the second stroke.

26. A non-transitory computer-readable medium storing software comprising instructions executable by one or more computers which, upon such execution, cause the one or more computers to perform operations comprising:

receiving, by a computing device, a sequence of strokes that represent a handwritten input that was input through traces shapes of one or more handwritten characters along a handwriting input area of the computing device;

determining, by the computing device, a predetermined sub-area of the handwriting input area that is characterized as a character end point sub-area;

determining, by the computing device, that (i) an end point of a first stroke of the sequence of strokes occurs in the predetermined sub-area of the handwriting input area that is characterized as a character end point sub-area, and (ii) a beginning point of a second stroke of the sequence of strokes that immediately follows the first stroke occurs in a second sub-area of the handwriting input area that is not characterized as a character end point sub-area;

based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the end point of the first stroke as a candidate end point of a first handwritten character traced by the sequence of strokes; and obtaining, by the computing device, a recognized character corresponding to the first handwritten character based at least in part on the designated candidate end point of the first handwritten character.

27. The medium of claim 26, wherein the operations further comprise:

based on determining that (i) the end point of the first stroke of the sequence of strokes occurs in the predetermined sub-area of the handwriting input area that is characterized as a character end point sub-area and (ii) the beginning point of the second stroke of the sequence of strokes that immediately follows the first stroke occurs in the second sub-area of the handwriting input area that is not characterized as a character end point sub-area, designating, by the computing device, the second stroke as being associated with a second handwritten character.

28. The medium of claim 26, wherein a location of the predetermined sub-area of the handwriting input area that is characterized as a character end point sub-area is based on a script associated with the handwritten input.

29. The medium of claim 26, wherein the predetermined sub-area of the handwriting input area that is characterized as a character end point sub-area is located in a bottom right portion of the handwriting input area.

30. The medium of claim 26, wherein the operations further comprise:

determining, by the computing device, that a beginning point of a third stroke of the sequence of strokes that immediately follows the second stroke occurs in the predetermined sub-area of the handwriting input area that is characterized as a character end point sub-area.

31. The medium of claim 26, wherein the operations further comprise:

determining, by the computing device, a distance between a left edge of the second stroke and a right edge of the second stroke.

32. The medium of claim 31, wherein the operations further comprise:

determining, by the computing device, that a beginning point of a third stroke of the sequence of strokes that immediately follows the second stroke occurs between the left edge of the second stroke and the right edge of the second stroke.

33. The medium of claim 32, wherein the operations further comprise:

determining, by the computing device, that a distance between the beginning point of the third stroke and the left edge of the second stroke satisfies a threshold distance.

34. The method of claim 1, wherein determining, by the computing device, the predetermined sub-area of the handwriting input area that is characterized as a character end point sub-area comprises determining, by the computing device, the predetermined sub-area of the handwriting input area to be used for evaluating each stroke in the sequence of strokes, and wherein the method further comprises determining, by the computing device and for each stroke in the sequence of strokes, whether the end point of the stroke occurs in the predetermined sub-area of the handwriting input area to be used for evaluating each stroke in the sequence of strokes.

35. The method of claim 1, wherein the candidate end point of the first handwritten character defines a candidate boundary between the first stroke and the second stroke that separates (i) a first group of strokes of the sequence of strokes that includes the first stroke and that corresponds to the first handwritten character, and (ii) a second group of strokes of the sequence of strokes that includes the second stroke and that corresponds to a second handwritten character.

36. The method of claim 1, further comprising:

determining, by the computing device, a predetermined sub-area of the handwriting input area that is characterized as a character start point sub-area, the character start point sub-area being different from the character end point sub-area; and wherein determining, by the computing device, that the beginning point of the second stroke of the sequence of strokes that immediately follows the first stroke occurs in the second sub-area of the handwriting input area that is not characterized as a character end point sub-area comprises:

determining, by the computing device, that the beginning point of the second stroke of the sequence of strokes occurs in the predetermined sub-area of the handwriting input area that is characterized as a character start point sub-area.

37. The method of claim 36, further comprising:

determining, by the computing device, a script associated with a particular language;

wherein determining, by the computing device, the predetermined sub-area of the handwriting input area that is characterized as a character start point sub-area comprises:

selecting, by the computing device and from among multiple predetermined sub-areas of the handwriting input area that are characterized as character start point sub-areas and each correspond to a respective language, a particular sub-area that corresponds to the particular language with which the determined script is associated; and wherein determining, by the computing device, the predetermined sub-area of the handwriting input area that is characterized as a character end point sub-area comprises:

selecting, by the computing device and from among multiple predetermined sub-areas of the handwriting input area that are characterized as character end point sub-areas and each correspond to a respective language, a particular sub-area that corresponds to the particular language with which the determined script is associated.

38. The method of claim 36, wherein the predetermined sub-area of the handwriting input area that is characterized as a character end point sub-area and the predetermined sub-area of the handwriting input area that is characterized as a character start point sub-area are partially overlapping sub-areas of the handwriting input area.

39. The method of claim 36, wherein the handwriting input area is divided into multiple regions, and each of the multiple regions is included in (i) the predetermined sub-area of the handwriting input area that is characterized as a character end point sub-area or (ii) the predetermined sub-area of the handwriting input area that is characterized as a character start point sub-area.

40. The method of claim 1, further comprising:
providing, by the computing device, data indicating the sequence of strokes and data indicating the designated candidate end point of the first handwritten character to a server system that provides a handwriting recognition service; and
wherein obtaining, by the computing device, the recognized character comprises receiving, by the computing device and from the server system, data indicating a recognized character for the first handwritten character.

41. The method of claim 1, wherein determining, by the computing device, the predetermined sub-area of the handwriting input area that is characterized as a character end point sub-area comprises determining, by the computing device, a predetermined set of multiple sections of the handwriting input area that form the predetermined sub-area of the handwriting input area that is characterized as a character end point sub-area.

42. The method of claim 1, wherein the handwriting input area has an associated grid, and wherein the predetermined sub-area of the handwriting input area that is characterized as a character end point sub-area corresponds to multiple contiguous sections of the grid.

43. The method of claim 1, wherein the predetermined sub-area of the handwriting input area that is characterized as a character end point sub-area includes at least half of the handwriting input area.

44. The method of claim 1, wherein the predetermined sub-area of the handwriting input area that is characterized as a character end point sub-area includes (i) a region that extends along a vertical edge of the handwriting input area and (ii) a region that extends along a horizontal edge of the handwriting input area.

* * * * *